United States Patent

White

[15] 3,638,176
[45] Jan. 25, 1972

[54] SEISMIC DIFFRACTION SCAN

[72] Inventor: James E. White, Midland, Tex.
[73] Assignee: Marathon Oil Company, Findlay, Ohio
[22] Filed: Jan. 5, 1970
[21] Appl. No.: 514

[52] U.S. Cl. .............. 340/15.5, 340/15.5 AC, 340/15.5 TC, 340/15.5 MC, 340/15.5 CP
[51] Int. Cl. .......................................... G01v 1/00
[58] Field of Search ....................... 340/15.5 MC, 15.5 TC

[56] References Cited

UNITED STATES PATENTS

| 3,040,833 | 6/1962 | Mendenhall | 340/15.5 MC |
| 3,472,334 | 10/1969 | Snodgrass | 340/15.5 MC |

*Primary Examiner*—Rodney D. Bennett, Jr.
*Assistant Examiner*—H. A. Birmiel
*Attorney*—Joseph C. Herring, Richard C. Willson, Jr. and Jack L. Hummel

[57] ABSTRACT

Diffractive elements which are reported by acoustical waves in seismic exploration can be defined by a process wherein seismic traces from a plurality of seismic receivers are shifted by T (T = the travel time from a particular acoustical wave source to a diffractive element and thence to a particular seismic receiver), whereupon the seismic traces are added and the summation of the added seismic traces is indicative of the diffractive power of each diffractive element. The invention further comprises the shifting of seismic traces produced by a plurality of receivers by T and thence adding cross-correlations (the product of multiplying one member of a pair of seismic traces by the other member of the pair) among pairs of seismic traces wherein the summation is indicative of the diffractive power of each diffractive element.

6 Claims, 7 Drawing Figures

INVENTOR
JAMES E WHITE

BY

ATTORNEY

SEISMIC DIFFRACTION SCAN

BACKGROUND OF THE INVENTION

The invention relates to the art of seismology, more particularly to the processing of seismic data and most particularly to the identification of diffractive elements by processing seismic data.

The art of seismology or geophysical exploration is well known. Generally, the art comprises the steps of generating a seismic energy wave at or near the surface of the earth, and detecting and recording the seismic energy wave after it has been reflected and/or refracted by the interface of two dissimilar subsurface materials. The geophysicist may then determine the geophysical structure of the earth by processing the data produced by recordation during a geophysical survey.

Generally, seismic data is used to map continuous reflecting surfaces, usually beds which are approximately horizontal. The ordinary method of processing seismic data is to suppress seismic noise which may be produced by reflections from sand lenses, reef edges, salt intrusions, faults, or other abrupt changes in the rock properties in the horizontal plane. Such reflections are herein referred to as diffractions and the reflectors are called diffractive elements.

A number of patents have issued in the geophysical exploration area. U.S. Pat. No. 2,861,645 teaches a process for the enhancement of seismic signals by multiplication prior to recordation. The process suppresses random seismic noise. U.S. Pat. Nos. 3,059,718 and 3,195,676 teach the distinguishment and suppression respectively of seismic energy wave multiple reflections between two subsurface interfaces. U.S. Pat. No. 3,054,473 teaches an apparatus for the enhancement of seismic data by detonating a plurality of explosive charges in a shot hole. U.S. Pat. 3,078,947 teaches a method for geophysical surveying utilizing the dropping of a weight in place of the detonation of an explosive. None of the above patents teach the process of the present invention.

SUMMARY OF THE INVENTION

It is the purpose of this invention to utilize, rather than suppress, diffractions from discontinuous reflectors in order to portray the irregular geologic conditions which are of interest. It is the further purpose of the invention to show how seismic data produced by a plurality of detectors and a plurality of sources can be processed to enhance seismic information produced by local inhomogeneities and to suppress, relatively, the stronger reflections from continuous horizontal beds. The invention further provides a process for determining the location of diffractive elements within the earth being explored.

Generally, the invention comprises a process wherein seismic traces from many receivers and separate sources are each shifted by T, wherein T equals the travel time from a particular source to a diffractive element and thence to a particular receiver. Thereafter, the traces are added or cross-correlated. The summation is indicative of the diffractive power of each diffractive element reported. By selecting the proper parameters, the greatest diffractive power is determined for each diffractive element. By determining the greatest diffractive power, the position of the diffractive element may be determined. The greatest diffractive power is also indicative of the size of the diffractive element.

By applying the process disclosed in this invention, the seismologist can map the location and approximate size of localized irregular inhomogeneities in the earth.

DESCRIPTION OF THE PREFERRED EMBODIMENTS

The preferred embodiments will be more easily understood by reference to the drawings. In the drawings, like components are numbered with the same number.

Figure 1:
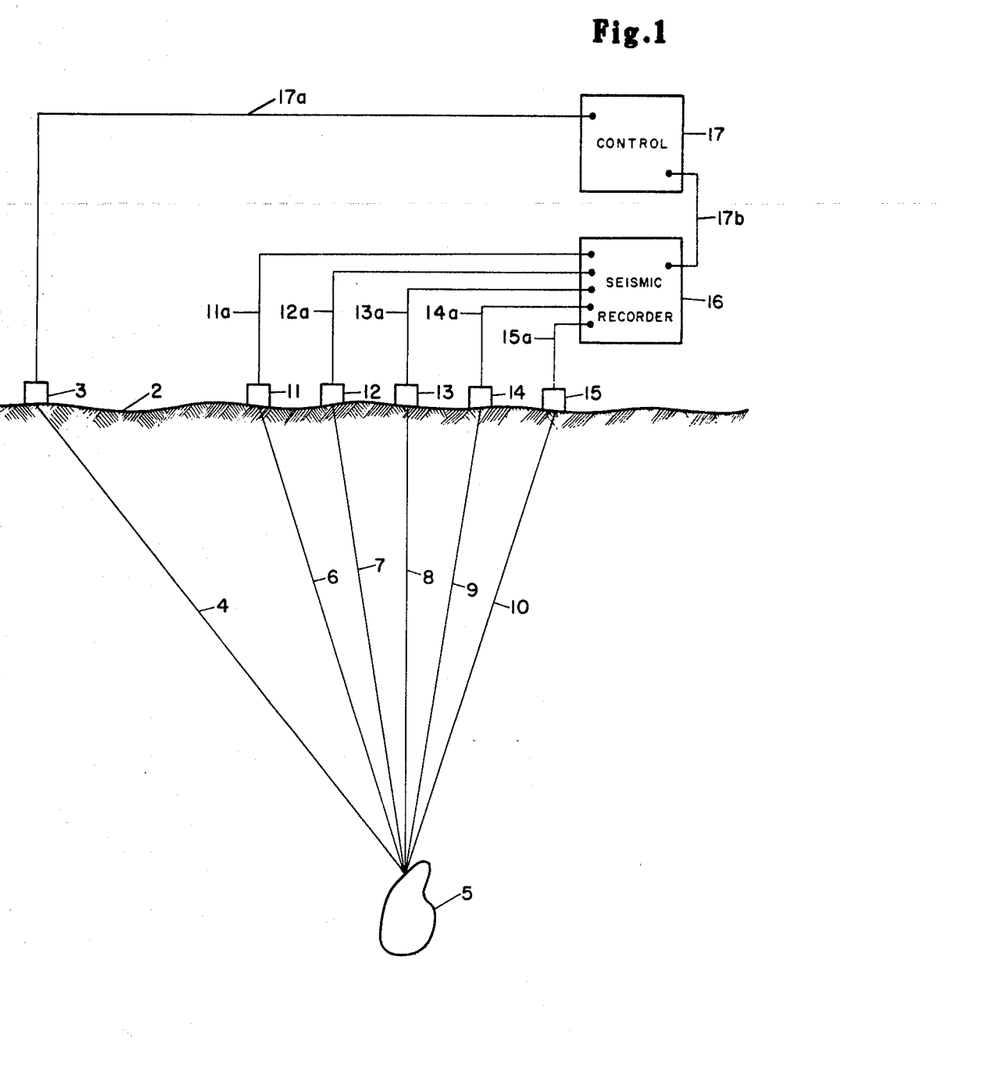
FIG. 1 is a schematic illustration of the earth with seismic surveying apparatus in position. Typical paths of the acoustical waves traveling from the source to a diffractive element and thence to the seismic receivers are shown.

Referring to FIG. 1, an acoustical source 3 (e.g., transducer, detonation of an explosive, etc.) is placed on or near the surface of the earth 2. An acoustical wave travels along the path 4 from the acoustical wave source 3 to diffractive element 5 which lies below the surface of the earth 2. The acoustical wave is scattered or diffracted by the diffractive element 5 and the scattered or diffracted acoustical waves follow paths 6, 7, 8, 9 and 10 from the diffractive element 5 to the seismic receivers 11, 12, 13, 14 and 15 (which are identical), respectively, which are positioned at or near the surface of the earth 2. The seismic receivers 11, 12, 13, 14, and 15 are connected by suitable means 11a, 12a, 13a, 14a, and 15a, respectively, to seismic recorder 16. Control unit 17 is connected by suitable means 17a to the acoustical wave source 3 and by suitable means 17b to the seismic recorder 16.

Figure 2:
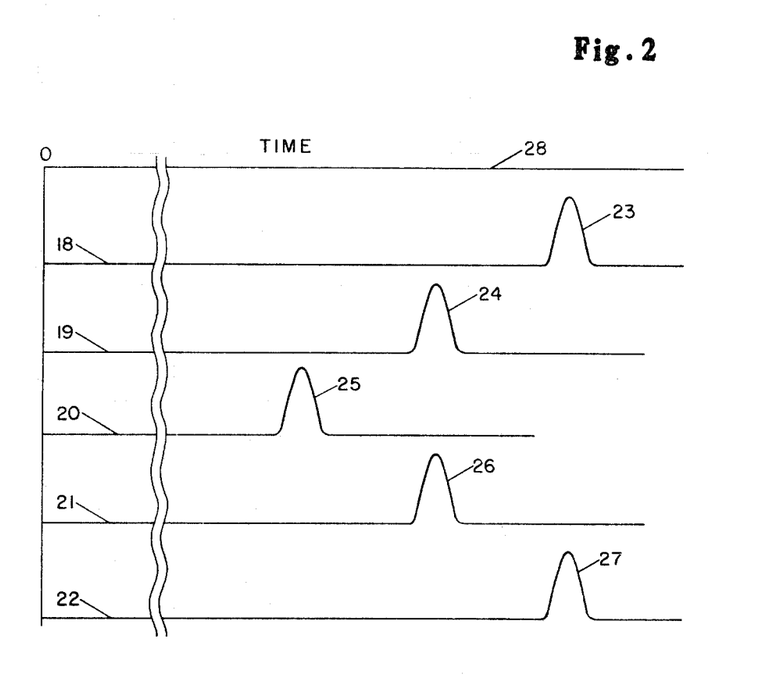
FIG. 2 shows, schematically, a typical pattern of seismic traces which are produced by a seismic surveying apparatus when a diffractive element is detected.

FIG. 2 is a typical pattern of seismic traces produced by a plurality of seismic receivers 11, 12, 13, 14 and 15, wherein the acoustical receivers and the acoustical wave source are positioned in a straight line. Traces 18, 19, 20, 21 and 22 represent the output of seismic receivers 11, 12, 13, 14 and 15, respectively, as drawn by seismic recorder 16. Trace peaks 23, 24, 25, 26 and 27 represent the output of the seismic receivers when the acoustical wave produced by the acoustical wave source 3 arrives at the respective receivers after being diffracted by the diffractive element 5. The position of the trace peaks under the time scale 28 indicates the time of arrival of the diffracted acoustical wave at the respective seismic receivers. As can be seen, the acoustical wave arrives at the respective receivers at different times depending upon the position of the receiver with respect to the diffractive element 5. Time equal to zero represents the time an acoustical wave is produced by the acoustical wave source 3.

Figure 3:
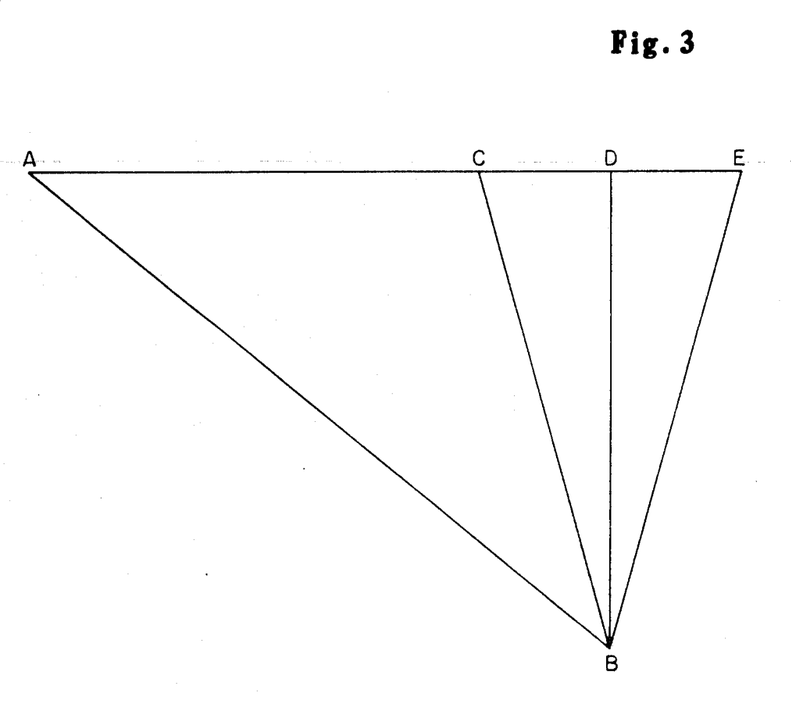
FIG. 3 is an approximate plane geometric representation of FIG. 1.

In FIG. 3 the line ACDE represents the surface of the earth 2. "A" represents the acoustical wave source 3 at the surface of the earth. "B" represents the diffractive element 5. "D" represents seismic receiver 13, which is the nearest seismic receiver to the diffractive element 5. "C" and "E" represent seismic receivers on either side of seismic receiver 13 which correspond to seismic receivers 12 and 14 respectively.

In seismography the time between the generation of an acoustical wave and the detection of the reflected acoustical wave is measured. The time between generation and detection is a function of the distance traveled by the wave and the velocity of the wave within the medium of the earth. In FIG. 3 the distance which an acoustical wave would travel if it traveled to the diffractive element 5 from the acoustical source 3 and thence to the seismic receiver 13 is represented by the path A to B to D. Since seismic receiver 13 is the nearest receiver to diffractive element 5 along the earth's surface represented by line ACDE in FIG. 3, triangle ABD is approximately a right triangle. The total time of travel by an acoustical wave from A to B and thence to D is approximately represented by equation 1:

$$T = \sqrt{\left(\frac{AD}{V}\right)^2 + Tv^2} + Tv$$

where $T$ = the total time of travel from A to B and thence to D; $AD$ = *the distance between the source and the seismic receiver at D;* $V$ = the velocity of an acoustical wave within the geological formation; $T_v$ = the travel time of an acoustical wave from B to D. The travel time of an acoustical wave traveling from A to B and thence to C may be approximately represented by equation 2:

$$T = \sqrt{\left(\frac{AD}{V}\right)^2 + T_v^2} + \sqrt{\left(\frac{CD}{V}\right)^2 + T_v^2}$$

where $CD$ represents the distance between seismic receiver 13 which is the nearest receiver to the diffractive element and seismic receiver 12. An equation similar to the equation 2 may be derived for any other seismic receiver or acoustical wave source.

By selecting a seismic trace, hereafter called the "focus trace," to represent the seismic receiver at D the distance $AD$ and $CD$ are known. A $T_v$ and a $V$ may then be selected. Hence, a travel time of an acoustical wave traveling from A to B to any other seismic receiver may be calculated. This calculation will produce a suite of travel times representing every seismic receiver which recorded a trace for the acoustical wave produced by the acoustical source 3. When the $T_v$, $V$, and the focusing trace are properly selected and the travel time is subtracted from the travel time shown for the trace peaks in FIG. 2, the trace peaks will then be aligned as shown in FIG. 4.

Figure 4:
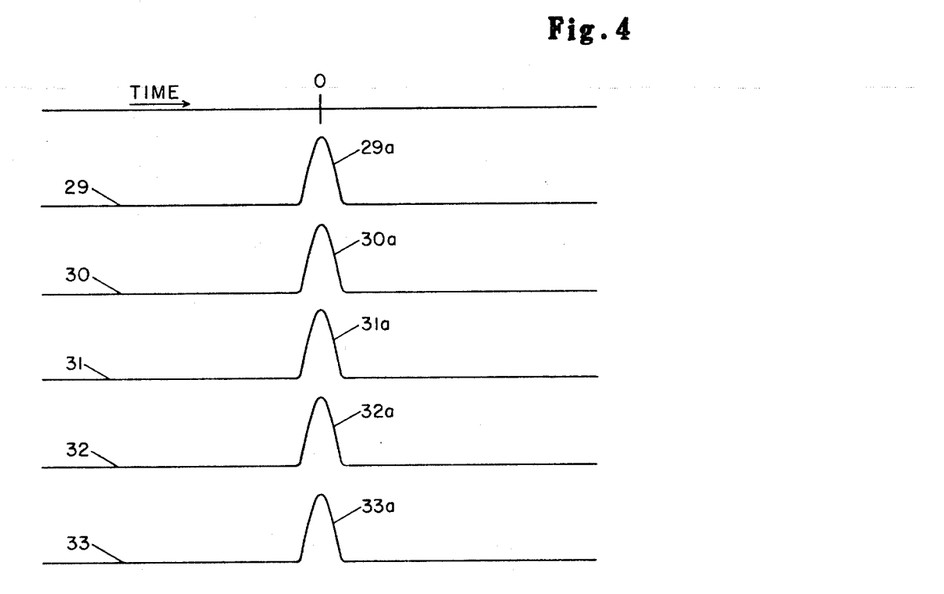
FIG. 4 shows graphically seismic traces which have been shifted by the travel time of an acoustical wave from the source to the diffractive element and thence to the respective receivers.

In FIG. 4 trace 29, 30, 31, 32, and 33 represent traces 18, 19, 20, 21, 22 after they have been shifted according to the calculated time. Peaks 29a, 30a, 31a, 32a, 33a represent peaks 23–27 respectively and are located at time equal to zero.

Figure 5:
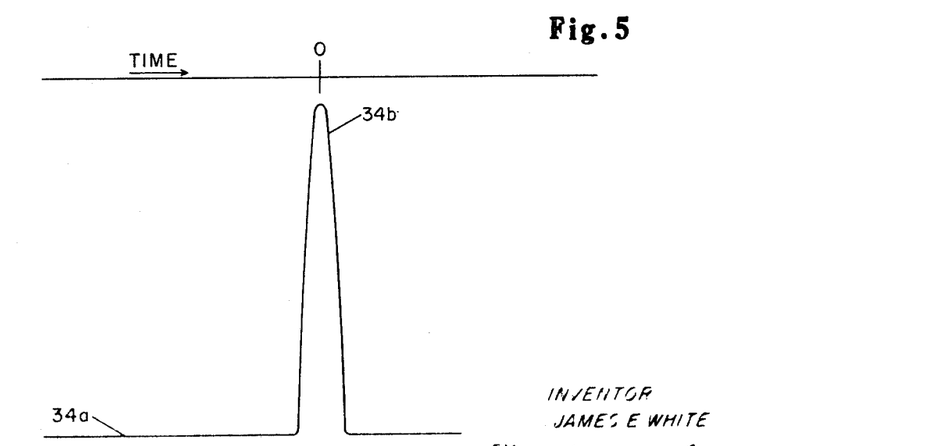
FIG. 5 shows graphically the summation of the seismic traces which have been shifted by the travel time of an acoustical wave traveling from the source to the diffractive element and thence to the respective receivers.

The amplitude of the traces at time equal to zero may be added or cross-correlated and the sum of the amplitudes or the sum of the products will be an index of the diffractive power of diffractive element 5. The summation of the amplitude is shown by the graph in FIG. 5. The amplitude of the sum of the peaks at time equal to zero is shown as peak 346 on summation trace 34a.

Figure 6:
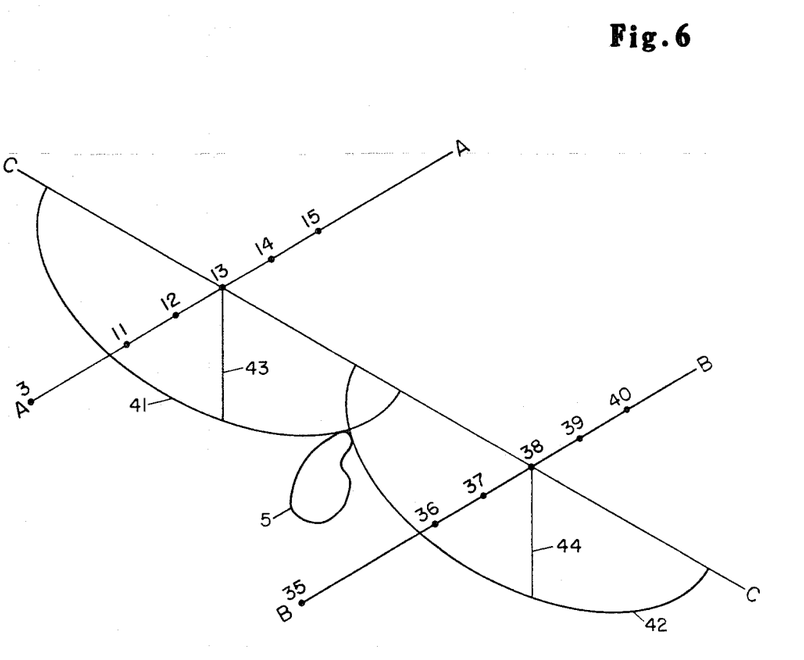
FIG. 6 shows graphically the intersection of two time rings, which are derived from the travel time determination, at the diffractive element.

Once the $T_v$, $V$, and focus trace have been selected to produce the greatest sum, the diffractive element will have a position on the circumference of an arc having a radius of $T_v$ times $V$, a center represented by the position of seismic receiver 13 which produced the focusing trace and which is in a plane perpendicular to the line of receivers and the source. If a seismic surveying apparatus with a line of receivers and a source is positioned parallel to the original line of receivers and another family of seismic tracks is produced for diffractive element 5, $T_v$ and $V$ and the focus trace may be determined for the second line. The diffractive element will be located at the intersection of the two arcs produced by the calculations. This is shown in FIG. 6 wherein line AA represents the line of the original acoustical wave source 3 and receivers 11, 12, 13, 14 and 15; line BB represents a line of a second acoustical wave source 35 and the seismic receivers 36, 37, 38, 39, and 40. Arcs 41 and 42 represent all possible positions of the diffractive element which are calculated as aforementioned. Line CC represents the intersection of the plane in which the arcs lie and the surface of the earth. Lines AA, BB, and CC all lie within a common plane which represents the surface of the earth. The center of arc 41 is receiver 13 which was determined to be the nearest receiver to diffractive element 5. The radius of arc 41 is the product of $T_v$ and $V$ which was determined by the aforementioned method. The center of arc 42 is receiver 38, which was determined to be nearest receiver to diffractive element 5 by the method aforementioned. The radius of arc 42 is the product of $T_v$ and $V$ which is calculated for the line BB by the aforementioned method. The diffractive element 5 is shown to lie at the intersection of arcs 41 and 42.

Figure 7:
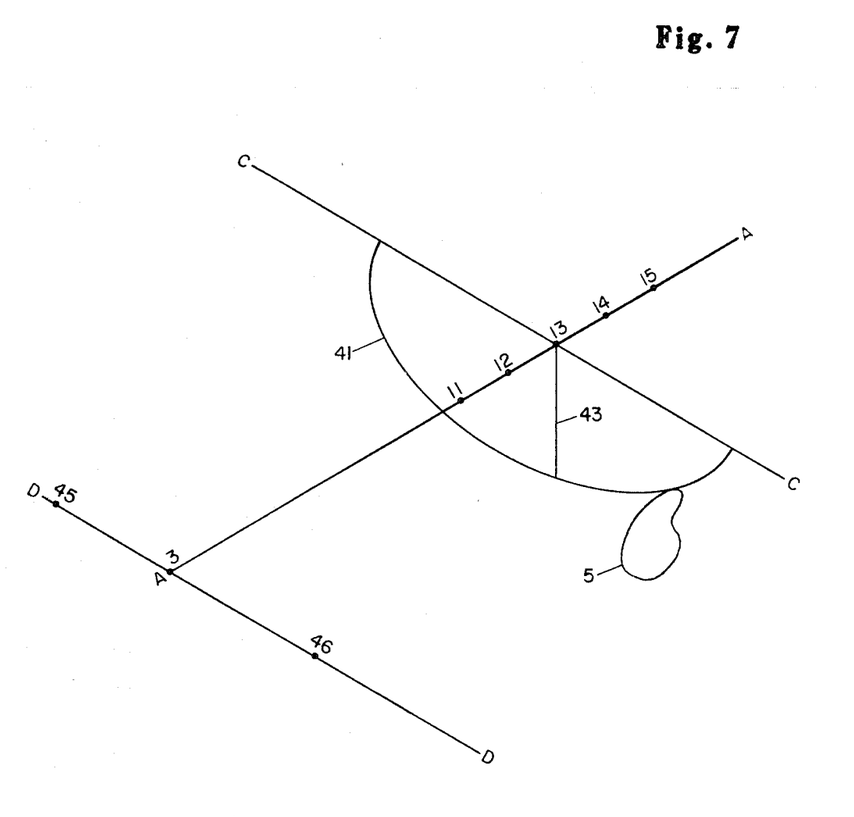
FIG. 7 shows graphically the location of the diffractive element utilizing off-line acoustical wave sources.

FIG. 7 shows one additional embodiment of the present invention. Components identified by the same number in FIGS. 6 and 7 are identical. In FIG. 7, lines AA, CC, and DD lie in a common plane which represents the surface of the earth. Line DD is normal to line AA. Acoustical wave sources 45 and 46 represent "off-line" acoustical wave sources. As shown above, $T_v$ and $V$ may be determined. From $T_v$ and $V$, the travel time of an acoustical wave traveling from acoustical wave source 3 to the diffractive element 5 and thence to seismic receiver 13 may by calculated by using equation 1, where the distance from acoustical source 3 to seismic receiver 13 is represented by $iAD$ in the equation. The travel time from the acoustical source 3 to the diffractive element 5 is then calculated by subtracting $T_v$ from the total travel time. By using acoustical wave source 46, another series of seismic traces may be produced by receivers 11, 12, 13, 14, and 15. The trace peaks will have the same pattern as that shown in FIG. 2. However, the position of the peaks will be different with relationship to time under the time scale 28 shown in FIG. 2. Since $T_v$ and $V$ are known from previous calculations, the travel time of an acoustical wave from acoustical wave source 46 to diffractive element 5 and thence to seismic receiver 13 may be determined by applying the same techniques as described above. Once the total travel time from acoustical wave source 46 to the diffractive element 5 and thence to seismic receiver 13 is determined, the travel time of an acoustical wave from acoustical wave source 46 to diffractive element 5 may be calculated by subtracting $T_v$ from the total travel time.

The position of diffractive element 5 along arc 41 may be determined by determining the point along arc 41 wherein the distance from acoustical wave source 46 to arc 41 is equal to the travel time of an acoustical wave from acoustical wave source 46 to diffractive element 5 multiplied by the velocity of the acoustical wave. The travel time and the velocity are determined by the method described above.

While the invention has thus been described by reference to the foregoing drawings and specific details, it is to be understood that its scope is not to be considered as limited to the details described above. The above-described embodiment applies to a seismic surveying apparatus which has the seismic receivers lying in a straight line with the acoustical wave source. Other arrays of seismic receivers and acoustical wave sources may be utilized to provide data from which the precise location of the diffractive element may be determined. A straight line array of receivers and sources with off-line receivers or off-line sources may be utilized. Sources and receivers may be positioned in vertical arrays. The apparatus used to generate the seismic data is not critical to this invention.

Another modification of the present invention is to shift the seismic traces such that the peaks corresponding to the diffracted acoustical waves are aligned, with respect to time, with the peak for the diffracted acoustical wave on the focus seismic trace. Other modifications and variations may become apparent to one skilled in the art. One such modification which is to be considered a part of this invention is the use of a computer to make the calculations necessary to determine $T_v$, $V$ and the focusing trace.

What is claimed is:

1. In a process for geophysical exploration wherein various discontinuous diffractive elements having various diffractive powers which can be indicated by adding or cross-correllating the traces diffracted by each such diffractive element are reported by acoustical waves transmitted from a source to the element and thence to the receiver, the improvement comprising in combination, (a) producing for a given diffractive element a plurality of seismic traces by a plurality of combinations of sources and receivers, (b) shifting each trace by the wave travel time from a particular source to the diffractive element and thence to the particular receiver said travel time being represented by approximately the following formula:

$$T = \sqrt{\frac{AD^2}{V} + T_v^2} + \sqrt{\frac{CD^2}{V} + T_v^2}$$

wherein $T$ is the total time of travel from a source of acoustical waves at point A to a diffractive element at point B and thence to an acoustic wave receiver at point C; $AD$ is the distance between the source and that point on the surface which is directly above the diffractive element, at D; $V$ is the velocity of an acoustical wave; $T_v$ is the travel time of an acoustical wave from the diffractive element at point B to point D and $CD$ is the distance between the surface point D and the seismic receiver located at point C, (c) adding the shifted seismic traces to obtain a summation trace indicative of the diffractive power of the diffractive element.

2. In a process for geophysical exploration wherein various discontinuous diffractive elements having various diffractive powers which can be indicated by adding or cross-correlating the traces diffracted by each such diffractive element are reported by acoustical waves transmitted from a source to the element and thence to the receiver, the improvement comprising in combination, (a) producing for a given diffractive element a plurality of seismic traces by a plurality of combinations of sources and receivers, (b) shifting each trace by the acoustical wave travel time from a particular source to the diffractive element and thence to the particular receiver, said travel time being represented by approximately the following formula:

$$T = \sqrt{\frac{AD^2}{V} + T_v^2} + \sqrt{\frac{CD^2}{V} + T_v^2}$$

wherein $T$ is the total time of travel from a source of acoustical waves to a diffractive element and thence to an acoustic wave receiver; $AD$ is the distance between the source and that point on the surface directly above the diffractive element; $V$ is the velocity of the wave; $T_v$ is the travel time of the acoustical wave from the diffractive element to that point directly above the diffractive element and $CD$ is the distance between the acoustic wave receiver and that point directly above the diffractive element, (c) correlating selected pairs of shifted seismic traces, and (d) adding the correlations to obtain a summation trace indicative of the diffractive power of the diffractive element.

3. The process of claim 1 wherein the plurality of sources and the plurality of receivers are aligned in a straight line.

4. The process of claim 3 wherein at least one off-line source is utilized to produce seismic traces which are indicative of the lateral position of the diffractive element.

5. The process of claim 2 wherein the plurality of sources and the plurality of receivers are aligned in a straight line.

6. The process of claim 5 wherein at least one off-line source is utilized to produce seismic traces which are indicative of the lateral position of the diffractive element.

* * * * *

PO-1050
(5/69)

UNITED STATES PATENT OFFICE
CERTIFICATE OF CORRECTION

Patent No. 3,638,176        Dated     Jan. 25, 1972

Inventor(s)     James E. White

It is certified that error appears in the above-identified patent and that said Letters Patent are hereby corrected as shown below:

Col. 3, lines 2-3    and       Should be printed in the same size and
Col. 5, lines 7-11               style of type face as the other columns
                                        of the printed patent not in italics.

Signed and sealed this 19th day of December 1972.

(SEAL)
Attest:

EDWARD M. FLETCHER, JR.                      ROBERT GOTTSCHALK
Attesting Officer                                Commissioner of Patents